Nov. 11, 1924.
G. T. EDWARDS ET AL
1,514,839
SELF CLOSING VALVE
Filed Nov. 4, 1922    2 Sheets-Sheet 1
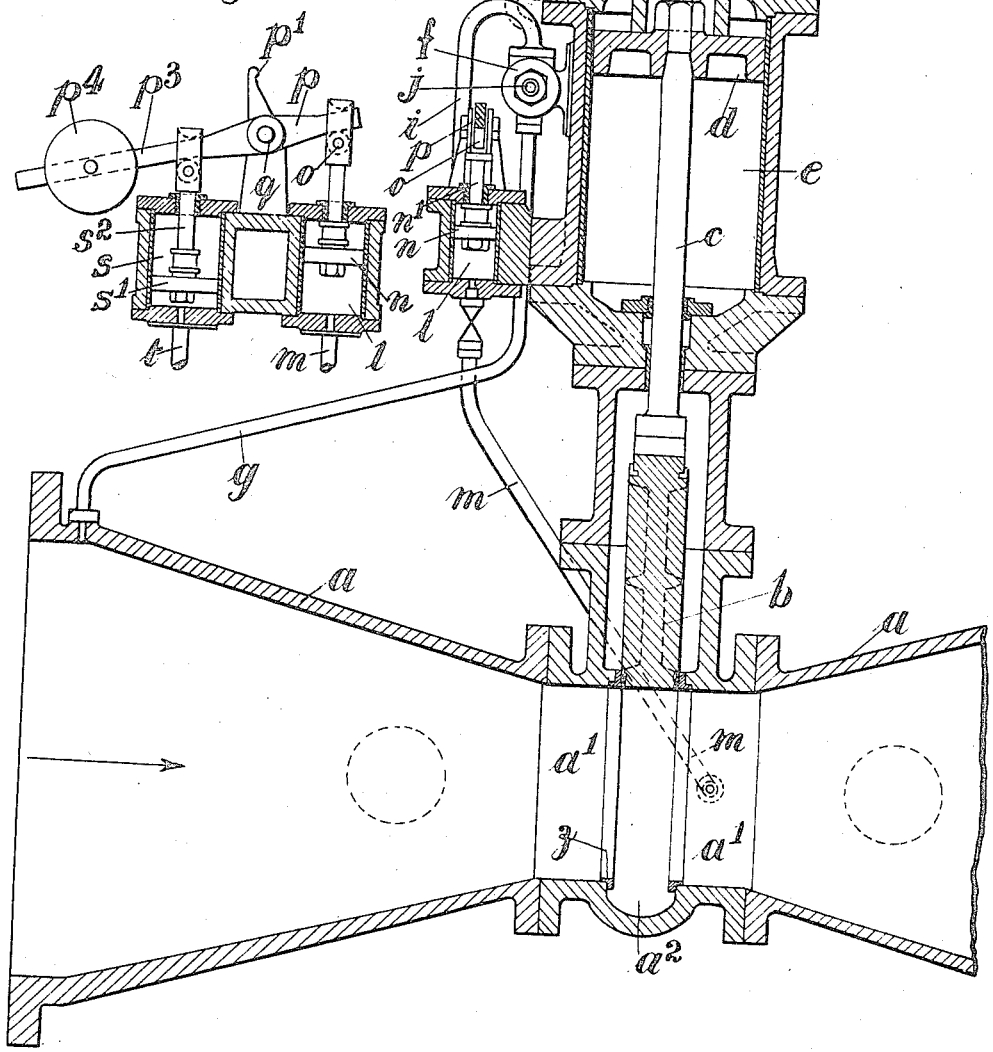
INVENTORS
Gerald T. Edwards
and Robert A. Blakeborough
by Herbert W. T. Jenner
Attorney.

Nov. 11, 1924.  
G. T. EDWARDS ET AL  
SELF CLOSING VALVE  
Filed Nov. 4, 1922  
1,514,839  
2 Sheets-Sheet 2
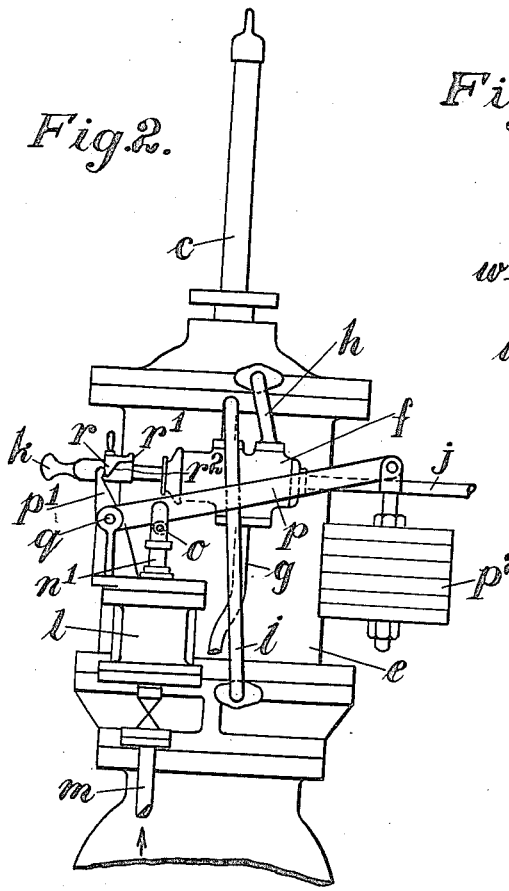
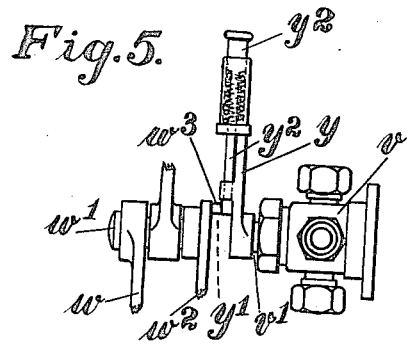
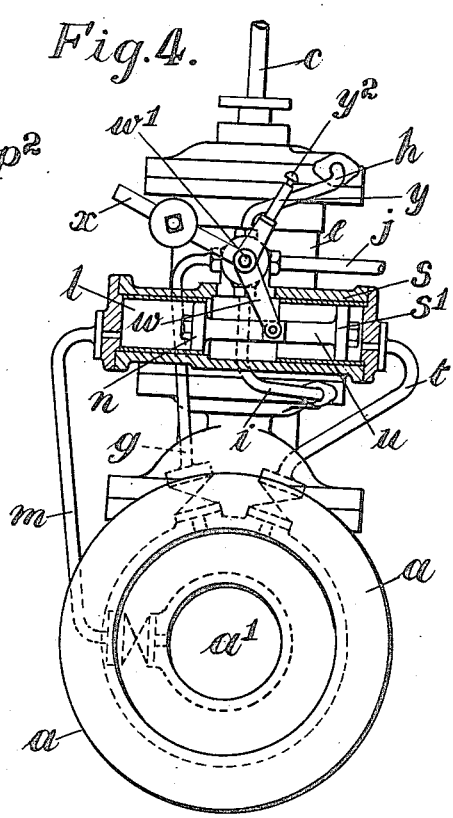
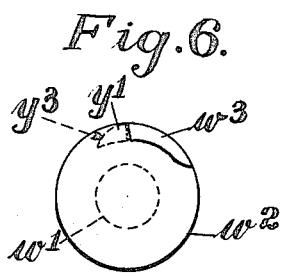
INVENTORS  
Gerald T. Edwards  
and Robert A. Blakeborough  
by Herbert W. T. Jenner  
Attorney Patented Nov. 11, 1924.

1,514,839

UNITED STATES PATENT OFFICE.

GERALD THORNHILL EDWARDS, OF LEICESTER, AND ROBERT ARNOLD BLAKE-BOROUGH, OF BRIGHOUSE, ENGLAND.

SELF-CLOSING VALVE.

Application filed November 4, 1922. Serial No. 599,097.

*To all whom it may concern:*

Be it known that we, GERALD THORNHILL EDWARDS and ROBERT ARNOLD BLAKEBOROUGH, subjects of King George V of Great Britain, residing, respectively, at Leicester, in the county of Leicester, England, and Brighouse, in the county of York, England, have invented a new and useful Improvement in or Relating to Self-Closing Valves, of which the following is a specification.

The invention relates to self-closing valves, and particularly to valves for use on pipe lines to cut off the flow in the event of an abnormal drop in pressure on the downstream side of the valve, such for instance as might occur in the case of a burst or fractured main, or of an abnormal "draw" on the pipe line.

For the purpose of the invention we make use of the well known "Venturi" law, that water flowing through a pipe of diminishing area decreases in lateral pressure as it gains in velocity.

According to the invention therefore we provide at the desired point in the pipe line a "Venturi" tube which comprises as is well known two truncated cones the smaller diameters of which approach one another and are joined by a short parallel portion or "throat."

In this throat and adapted to control the passage therethrough we provide a vertically working sluice valve and in the throat also we provide a communicating passage leading to control mechanism. The construction and arrangement of this mechanism is such that a reduction in lateral pressure in the throat, consequent upon increased velocity of flow therethrough resulting from a drop in pressure on the down-stream side of the valve, is utilized to operate a control valve by means of which a supply of pressure fluid acting below a piston to hold the sluice valve open is connected to exhaust, and a supply of pressure fluid is admitted above the piston and acts thereon to close the sluice valve.

Means are provided whereby the control valve after being automatically operated to close the sluice valve, can be operated manually to again connect the underside of the piston to pressure fluid and open the upper side to exhaust so that the sluice valve is opened, and such opening restores the control mechanism to normal position ready to again automatically close the sluice valve when called upon.

By the arrangement set forth the drop in lateral pressure when a burst occurs is accentuated owing to the diminished area of the throat. The size and consequently the cost of the sluice valve and of its operating mechanism are considerably reduced, and a quicker closing action can be obtained to avoid disaster in case of a burst than can be obtained where a sluice valve controlling the full diameter of the pipe line is employed.

The accompanying drawing illustrates how the invention may be carried into practice and, therein, Fig. 1 shews a sectional elevation of one embodiment of the invention;

Fig. 2 is a partial end view of Fig. 1, looking in the direction of the arrow A on said figure;

Fig. 3 is a sectional elevation of a modified arrangement wherein there is associated, with a piston acted upon by the throat pressure, a second or balancing piston open to the Venturi inlet pressure.

Fig. 4 shews another arrangement in which the two pistons, instead of being arranged side by side as in Fig. 3 are arranged co-axially. This figure also shews an alternative form of control valve to that shewn in Figs. 1 and 2; and Figs. 5 and 6 illustrate a detail relative to the arrangement shewn in Fig. 4.

Referring firstly to the embodiment shewn in Figs. 1 and 2, $a$ represents a Venturi tube placed in the pipe line, the flow through which is to be controlled. In the throat $a'$ of the tube, we provide a vertically working sluice valve $b$ of suitable construction, adapted in its closed position to command or cut off the flow through the said throat.

The spindle $c$ of the sluice valve has fast upon it a piston $d$ arranged to work in a cylinder $e$.

Suitably supported adjacent the cylinder $e$ is a control valve $f$ which has a communication $g$ with the pipe line at the entrance of, or on the upstream side of the Venturi tube, communications $h$ and $i$ with the cylinder spaces respectively above and below the piston $d$, and a communication $j$ to exhaust. The arrangement of the valve is such that whichever side of the piston $d$ is connected to pressure, the other side thereof is connected to exhaust.

In the embodiment now being described the control valve $f$ is shewn as being a sliding piston valve.

Supported beneath the spindle $k$ of this control valve is a small cylinder $l$ the lower part of which is in communication through pipe $m$, with the throat $a'$ of the Venturi tube.

Working within the cylinder $l$ is a piston $n$, the upwardly projecting rod $n'$ of which is provided with a runner $o$ on which rests the longer arm $p$ of an angle lever $p$, $p'$ suitably pivoted on a pin $q$. The outer end of the arm $p$ is suitably weighted as at $p^2$ and the shorter arm $p'$ is adapted to bear at its outer end against a part $r$ carried by the control valve spindle $k$.

So long as a normal flow proceeds through the Venturi tube, the lateral pressure in the throat $a'$ acts on the underside of the piston $n$ and holds the long arm $p$ of the angle lever raised, against the action of the weight. The spindle of the control valve can, in this position of the angle lever can be in the outward position shewn, in which position the control valve admits pressure fluid to the space below the piston $d$ and connects the space above it with exhaust, with the result that the sluice valve $b$ is held open.

If the pressure on the downstream side of the sluice valve falls abnormally the consequent increase in velocity of flow through the throat $a'$ causes a drop in the lateral pressure therein. The sustaining pressure below the piston $n$ is thus diminished and the weight $p^2$ acts to rock the angle lever. The arm $p'$ of such lever thereupon moves the spindle of the control valve inwardly, and causes the control valve to cut off pressure fluid from the underside of piston $d$ and admit pressure fluid above the said piston with the result that the sluice valve is closed.

It will be apparent that, by suitable adjustment of the weight $p^2$ on the angle lever, the drop in pressure in the pipe line on the downstream side of the Venturi tube, necessary to effect closing of the sluice valve, may be determined according to requirements.

To permit of re-setting of the control valve, after the closing operation above described, to cause the sluice valve to re-open, the part $r$ on the control valve spindle, with which the arm $p'$ of the angle lever engages, may conveniently be in the form of a forked member pivoted to the spindle at $r'$ and having the inner sides of its depending legs, which are arranged to straddle the spindle, inclined at a suitable angle as at $r^2$. After the mechanism has operated to close the valve, the member $r$ can be raised on its pivot and the spindle pulled out manually to reverse the control valve.

The end of the arm $p'$ of the angle lever will then lie, as will be understood, on the inner side of the part $r$ that is to say between same and the control valve. As, however, the angle lever rocks back to initial position with the rising of piston $n$ as the downstream pressure regains the normal, the outer side of the arm $p'$ engages the inclined faces $r^2$ on the part $r$ and raises said part on its pivot so that the end of the arm passes beneath the said part. On the angle lever reaching its initial position it passes clear of the part $r$ which drops down again ready, as shewn in Fig. 2, to be acted upon the next time a drop in pressure on the downstream side of the pipe line calls for closing of the sluice valve.

Preferably, an indicator in the form say of a pointer actuated by or from the control valve spindle and moving over or adjacent a suitably located indicator plate, is provided to enable the position of the control valve to be readily ascertainable.

In the arrangement shewn at Fig. 3 a second cylinder $s$ is arranged alongside the cylinder $l$ and has its lower part connected, by a pipe $t$, with the upstream Venturi inlet pressure. A piston $s'$, working in the cylinder $s$, has its rod $s^2$ connected with an extension $p^3$ of the angle lever which operates the control valve spindle. In this instance, the weight $p^2$ on the arm $p$ of the lever is dispensed with, the upstream pressure acting on piston $s'$ tending to rock the angle lever in a direction to give a closing movement to the control valve spindle, but being restrained by the action of the downstream pressure on piston $n$. A movable weight $p^4$ on the extension or arm $p^3$ enables the balance to be preserved and the drop in pressure required below piston $n$ to effect closing of the sluice valve to be adjusted as desired.

In the arrangement shewn in Fig. 4, instead of the cylinders $l$ and $s$ being located side by side as in Fig. 3, they are arranged co-axially and connected to a common rod $u$. In this instance also, the piston form of control valve shown in Figs. 1 and 2 is replaced by a four-way cock $v$ having connections similar to the piston valve. An arm $w$ pivotally connected to the rod $u$ has its boss fast upon a short pivotally mounted spindle $w'$ carrying at its end a disc $w^2$ provided with a projection $w^3$. An adjustably weighted arm $x$ has its boss also fast upon the spindle $w'$.

The projection $w^3$ is adapted to engage a projection $y'$ on a spring plunger $y^2$, carried by an arm $y$ fast upon the rotary spindle $v'$ of the four-way cock. In the normal positions of the parts the projection $w^3$ bears against the projection $y'$, as shewn in Fig. 6, so that when the spindle $w'$ is rocked by reason of the movement of piston $n$, the arm $y$ is also rocked and the four-way cock is operated to admit pressure fluid above the piston $d$ and to connect the lower side of the piston to exhaust. To reset the apparatus, the plunger $y^2$ is depressed to move the projection $y'$ radially inwards clear of the projection $w^3$. The arm $y$ can then be operated manually to reverse the four-way cock and thereby cause the sluice valve to open, the gradual rise of piston $d$ causing the projection $w^3$ to gradually ride over the curved outer face $y^3$ of the projection $y'$. The spring plunger permits the latter to move inwardly under the action of the projection $w^3$ and, when the latter has passed clear, causes the projection $y'$ to be re-instated into normal position.

The action is similar to that of the previously described arrangement, the only difference being that instead of an arm $p'$ of an angle lever, rocked by a drop in pressure beneath piston $n$, giving sliding movement to a control valve spindle, the movement of the piston now gives a partial rotation to a control valve spindle.

It will be obvious that instead of the cylinders $l$ and $s$ being arranged horizontally as in Fig. 4, they may equally well be arranged vertically one above the other.

The seating ring $z$ in the throat on the upstream side of the sluice valve may be slightly constricted so as to cause the water stream to jump or shoot across the mouth of the depression.

Having thus described our invention, what we claim as new and desire to secure by Letters Patent is:—

1. An apparatus for controlling the flow of liquid, comprising a main pipe having a constricted throat, a main valve controlling the flow through the said pipe, a cylinder provided with a piston for operating the said valve, a pressure distributing valve provided with an inlet pipe connected to the said main pipe in advance of the said throat and having pressure pipes connected to the respective ends of the said cylinder, a regulator cylinder provided with a regulator pipe connecting it with the main pipe below the main valve, a regulator piston slidable in the regulator cylinder, a pivoted lever operatively connected with the regulator piston and with the pressure distributing valve, the said main valve being held open when the pressure in the said regulator cylinder is normal, and means for operating the said lever automatically when the pressure in the said regulator cylinder is diminished to a predetermined extent, thereby effecting the reversal of the pressure distributing valve and the closure of the main valve.

2. An apparatus for controlling the flow of liquid as set forth in claim 1, the said distributing valve being a slide valve provided with a pivoted lug on its spindle, and the said lever having an arm which engages with the said lug and operates the slide valve when the lever is moved in one direction and which tilts the lug on its pivot and passes under it when the lever is moved in the reverse direction.

3. An apparatus for controlling the flow of liquid as set forth in claim 1, the said pivoted lever being actuated automatically by means of a cylinder provided with an inlet pipe connected to the main pipe in advance of its said throat and having a piston which is operatively connected with the said lever.

In testimony whereof we affix our signatures.

GERALD THORNHILL EDWARDS.
ROBERT ARNOLD BLAKEBOROUGH.